No. 658,230. Patented Sept. 18, 1900.
G. BERTHOLD.
PROCESS OF MAKING PHOSPHOR TIN.
(Application filed Apr. 6, 1900.)
(No Model.)
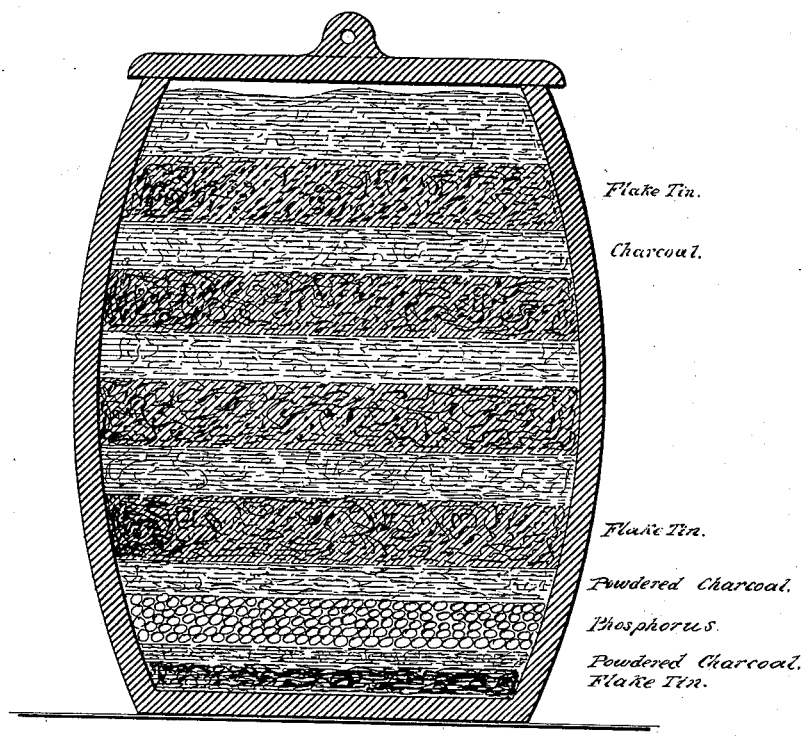
WITNESSES:
INVENTOR
George Berthold
BY
ATTORNEYS
THE NORRIS PETERS CO., PHOTO-LITHO., WASHINGTON, D. C.

ract.
UNITED STATES PATENT OFFICE.

GEORGE BERTHOLD, OF GREAT FALLS, MONTANA.

PROCESS OF MAKING PHOSPHOR-TIN.

SPECIFICATION forming part of Letters Patent No. 658,230, dated September 18, 1900.

Application filed April 6, 1900. Serial No. 11,789. (No specimens.)

*To all whom it may concern:*

Be it known that I, GEORGE BERTHOLD, a citizen of the United States, and a resident of Great Falls, in the county of Cascade and State of Montana, have invented a new and Improved Process of Infusing Phosphorus into Tin, of which the following is a full, clear, and exact description.

The object of the invention is to provide a new and improved process of infusing phosphorus into tin and making phosphor-bronze in a comparatively simple and inexpensive manner and without danger to the operator by avoiding to a great extent the formation of the obnoxious fumes usually arising in the manufacture of phosphor-bronze as heretofore practiced, the produced phosphor-bronze being very homogeneous and without blowholes, and hence rendered valuable for the manufacture of a great variety of industrial and ornamental objects.

The process consists, essentially, in subjecting a charge of tin, charcoal, and phosphorus while contained in a crucible and under the exclusion of air to the action of heat in a furnace to cause the tin to melt and absorb a portion of the phosphorus to form phosphor-tin to be used with copper to make castings of phosphor-bronze.

In order to carry this process into effect, I proceed in detail as follows, reference being had to the accompanying drawing, showing a sectional view of a crucible filled with a charge of tin, phosphorus, and charcoal and ready for heating in a furnace.

Ordinary block-tin is first melted and then poured into cold water to form the tin into flakes, sponge, or shot. Next I take a crucible and place in the bottom thereof a layer of powdered charcoal to the depth of about one and one-half inches, and on said layer of charcoal I place a layer of sponge-tin to a depth of an inch, and then I cover this layer of tin with charcoal until the upper surface is smooth. On said surface I place the phosphorus in stick form in the proportion of, say, four pounds to forty pounds of sponge-tin to be treated at the time and carrying about four pounds of moisture. The phosphorus is then covered with powdered charcoal and then layers of charcoal and tin are alternately placed to the depth of two inches to fill the crucible to within two inches of the top. The charge now contained in the crucible is then sealed with charcoal up to the rim of the crucible and then the cover is placed on the crucible and the latter is put into the furnace and heated. The heat from the furnace causes a burning of the phosphorus and a melting of the tin, which latter absorbs the phosphorus to form phosphor-tin to be added in a hot or cold state to melted copper to form a casting of phosphor-bronze. The crucible is subjected to the heat of the furnace until the flame of the phosphorus is dead, which can be observed by removing the cover of the crucible from time to time. Usually it takes about one and one-half hours to complete the process.

In case the phosphorus ignites by friction or otherwise while the charge is being prepared in the crucible then the operator can readily extinguish the flame by covering it with charcoal and then keep on and finish the charge, as above described.

The phosphor-tin obtained contains about ten per cent. of phosphorus, and the loss of phosphorus is very slight in comparison to that with the usual methods now employed in making phosphor-bronze.

The phosphor-bronze castings obtained are very homogeneous and without blow-holes, thus rendering the product available for the manufacture of a great variety of industrial and ornamental objects.

Having thus fully described my invention, I claim as new and desire to secure by Letters Patent—

The herein-described process of making phosphor-tin, consisting in subjecting layers of charcoal, tin and phosphorus to the action of heat under exclusion of air, to melt the tin and cause the latter to absorb a portion of the phosphorus.

In testimony whereof I have signed my name to this specification in the presence of two subscribing witnesses.

GEORGE BERTHOLD.

Witnesses:
F. B. LUCKHART,
G. H. MULLERY.